United States Patent
Iwakura et al.

(10) Patent No.: US 7,509,521 B2
(45) Date of Patent: Mar. 24, 2009

(54) MEMORY DUMP GENERATION WITH QUICK REBOOT

(75) Inventors: Hiroyuki Iwakura, Chofu (JP); Takeshi Misu, Kawasaki (JP)

(73) Assignee: Microsoft Corporation, Redmond, WA (US)

( * ) Notice: Subject to any disclaimer, the term of this patent is extended or adjusted under 35 U.S.C. 154(b) by 636 days.

(21) Appl. No.: 10/924,712

(22) Filed: Aug. 23, 2004

(65) Prior Publication Data

US 2006/0041739 A1 Feb. 23, 2006

(51) Int. Cl.
*G06F 11/00* (2006.01)
(52) U.S. Cl. .............................. 714/5; 714/38
(58) Field of Classification Search ............... 714/1–26, 714/36, 38
See application file for complete search history.

(56) References Cited

U.S. PATENT DOCUMENTS

| | | | |
|---|---|---|---|
| 6,226,761 B1 | 5/2001 | Berstis | 714/37 |
| 6,543,010 B1 | 4/2003 | Gaudet et al. | 714/45 |
| 6,604,123 B1* | 8/2003 | Bruno et al. | 718/100 |
| 6,671,786 B2 | 12/2003 | Wang et al. | 711/162 |
| 6,681,348 B1 | 1/2004 | Vachon | 714/45 |
| 6,687,799 B2 | 2/2004 | Smullen et al. | 711/154 |
| 7,290,175 B1* | 10/2007 | Kessler et al. | 714/37 |
| 2003/0009640 A1* | 1/2003 | Arimilli et al. | 711/147 |
| 2003/0145157 A1* | 7/2003 | Smullen et al. | 711/104 |
| 2003/0158842 A1* | 8/2003 | Levy et al. | 707/3 |
| 2003/0177428 A1* | 9/2003 | Wakabayashi et al. | 714/741 |

OTHER PUBLICATIONS

Chen, P. M. et al., "*The Rio File Cache: Surviving Operating System Crashes*". In Proceedings of the 7th International Conference on Architectural Support for Programming Languages and Operating Systems, pp. 74-83 (1996).

Ng, W. T. et al., "*Integrating Reliable Memory in Databases*". In Proceedings of the 1997 International Conference on Very Large Data Bases. The VLDB Journal, vol. 7, No. 3, pp. 194-204 (Aug. 1998).

Ng, W. T. et al., "*The Design and Verification of the Rio File Cache*". IEEE Transactions on Computers, vol. 50, No. 4, pp. 322-337 (Apr. 2001).

* cited by examiner

*Primary Examiner*—Scott T Baderman
*Assistant Examiner*—Jigar Patel
(74) *Attorney, Agent, or Firm*—Merchant & Gould, P.C.

(57) ABSTRACT

A method and system for writing a data image in the main memory of a computer to a secondary storage device minimizes delay in performing a required reboot. Prior to the reboot, a portion of the physical memory is copied either to a reserved memory space or to secondary storage, or one portion of memory may be copied to a reserved memory space and another portion may be copied to secondary storage. After reboot, memory usage is initially limited to the portion of memory that was copied prior to the reboot. The remaining physical memory is incrementally written to the storage device and dynamically added as memory for use by the operating system. If the reboot is due to a crash or other problem, completion of a full memory dump may be cancelled if, upon scanning memory, it is determined that the problem is a known issue.

27 Claims, 8 Drawing Sheets

MEMORY DUMP GENERATION WITH QUICK REBOOT

FIELD OF THE INVENTION

The present invention relates generally to computer systems, and more particularly to a method and system for writing a main memory data image to secondary storage while minimizing the delay in performing a required reboot.

BACKGROUND OF THE INVENTION

Operating systems typically are configured to perform memory dumps upon the occurrence of system crashes and serious failures involving hung user processes and services. A memory dump comprises copying the contents of main memory to secondary storage, for example in the form of a file stored on a hard disk or other secondary storage medium. In the case of a system crash, a memory dump typically must be followed by a reboot of the system. Full memory dumps are indispensable resources for the analysis and correction of problems related to crashes and for the development of reliable systems.

Writing data from main memory to a hard disk is a relatively slow operation. In the case of a full memory dump, the system must scan the entire contents of memory and write the contents to secondary storage. Thus the principal drawback to generating a full memory dump is the length of "down time" it entails for the system, during which the system is effectively unusable for other purposes. This down time is a function of the onboard memory size and, where a system reboot is required, the speed of the boot storage device. Writing sixteen gigabytes of memory to disk, for example, takes more than an hour to complete. For a computer system with 64 gigabytes of memory, generating a full memory dump may take as long as six hours.

Figure 1:
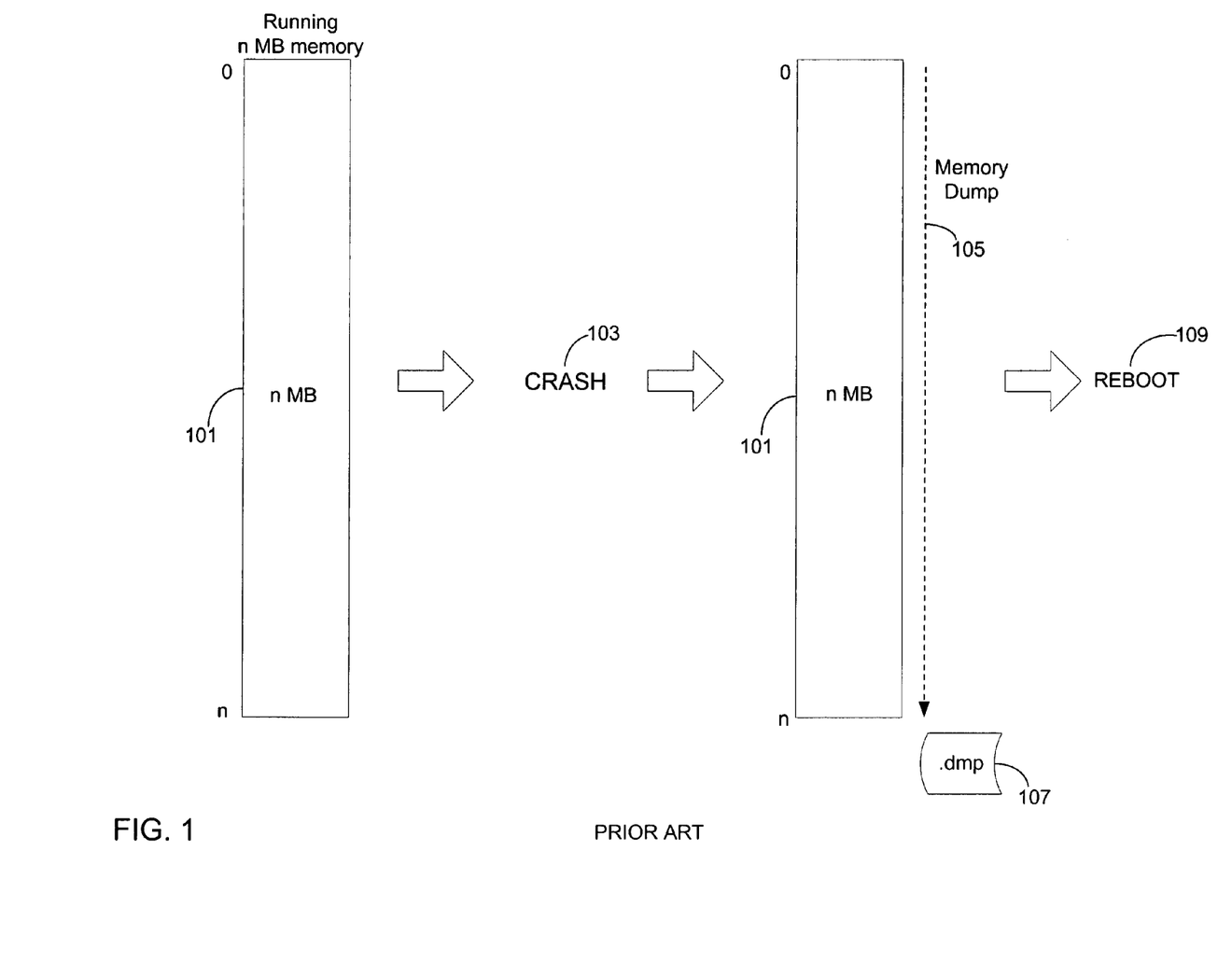
FIG. 1 is a diagram illustrating the generation of a full memory dump following a system crash and followed by a reboot, in accordance with the prior art.

FIG. 1 of the drawings accompanying this specification provides a simplified illustration of the process by which a full memory dump is performed following a system crash, in accordance with the prior art. This illustration is instructive in clarifying the detailed description of the invention provided below. In FIG. 1, events in time are represented, with time increasing from left to right. Initially, the system runs with its full amount of memory 101, here n gigabytes. A system crash event 103 occurs. A full memory dump of the n gigabytes of memory 101 is performed (signified by the arrow 105), following which the computer system undergoes a reboot 107.

The amount of physical memory included in conventional computers has been steadily increasing. This increase is due to regular capacity improvements in random access memory (RAM) technology, to the availability of 64-bit processor technology, and to growth in memory usage by typical computer programs. As a result, the average down time associated with the performance of full memory dumps has increased. Currently, enterprise server machines are equipped to use as much as 32 to 64 gigabytes of onboard RAM. It is expected that by 2007 low-end and mid-range servers will be capable of using up to 128 gigabytes of RAM. In such cases, the performance of a full memory dump after a crash, followed by a reboot of the system, will usually be impractical.

Alternatives to performing a full memory dump exist. For example, a memory dump of a portion of main memory, such as the operating system kernel space or the space allocated to a specific process, can be performed. However, it is generally not possible to know in advance whether a crash is due to a kernel-mode process or to a specific user process. Moreover, in some cases involving a "freeze" of the system it is not possible to generate a process-specific memory dump.

SUMMARY OF THE INVENTION

The present invention is directed towards providing a method and system for writing a data image in the main memory of a computer to a secondary storage device in such a way that the delay in performing a required reboot is minimized. Prior to the reboot, a copy of a portion of the physical memory is made. The computer is rebooted, and the operating system is initially limited in its memory usage to the portion of memory that was copied prior to the reboot. The remaining physical memory is incrementally written to the storage device and dynamically added as memory for use by the operating system.

According to one aspect of the invention, a reserved memory space is maintained. The copying of the portion of the physical memory prior to reboot comprises copying the portion to the reserved space. After the reboot, the reserved memory space is written to the storage device.

According to another aspect of the invention, no reserved memory space is used; the copying of the portion of the physical memory prior to reboot comprises writing the portion to the secondary storage device.

According to yet another aspect of the invention, the physical memory copied prior to reboot includes one portion of memory that is copied to a reserved memory space, and another portion that is written to the secondary storage device.

The invention is also directed towards a method for investigating a problem requiring a reboot, such as a system crash event. After the reboot, the memory image is scanned and a memory dump is incrementally generated. However, if during the scanning it is determined that the problem is a known issue or otherwise does not require completion of a full memory copy, the completion of the memory dump may be cancelled.

DETAILED DESCRIPTION OF THE INVENTION

The present invention provides a technique that reduces the down time associated with the performance of a large memory copy to secondary storage in circumstances requiring a reboot. In accordance with the invention, the completion of the memory dump is deferred until after the system reboot has occurred, thus enabling the system to reboot relatively quickly following an event such as a crash. An initial memory area is copied, thus freeing a limited memory space for use by the operating system following the reboot. After the reboot, the operating system initially operates with this limited amount of physical memory. The memory space existing outside of operating system control is scanned and written to a memory dump file or the like. After each discrete subrange of scanning and writing, the operating system adds a corresponding amount of physical memory to the system. If the reboot is due to a system crash or other problem, investigation of the cause of the problem can begin immediately after the reboot as the memory image is scanned. If it is determined that the problem is due to a known issue or otherwise has an easy solution, completion of the full memory dump can be cancelled.

Figure 2:
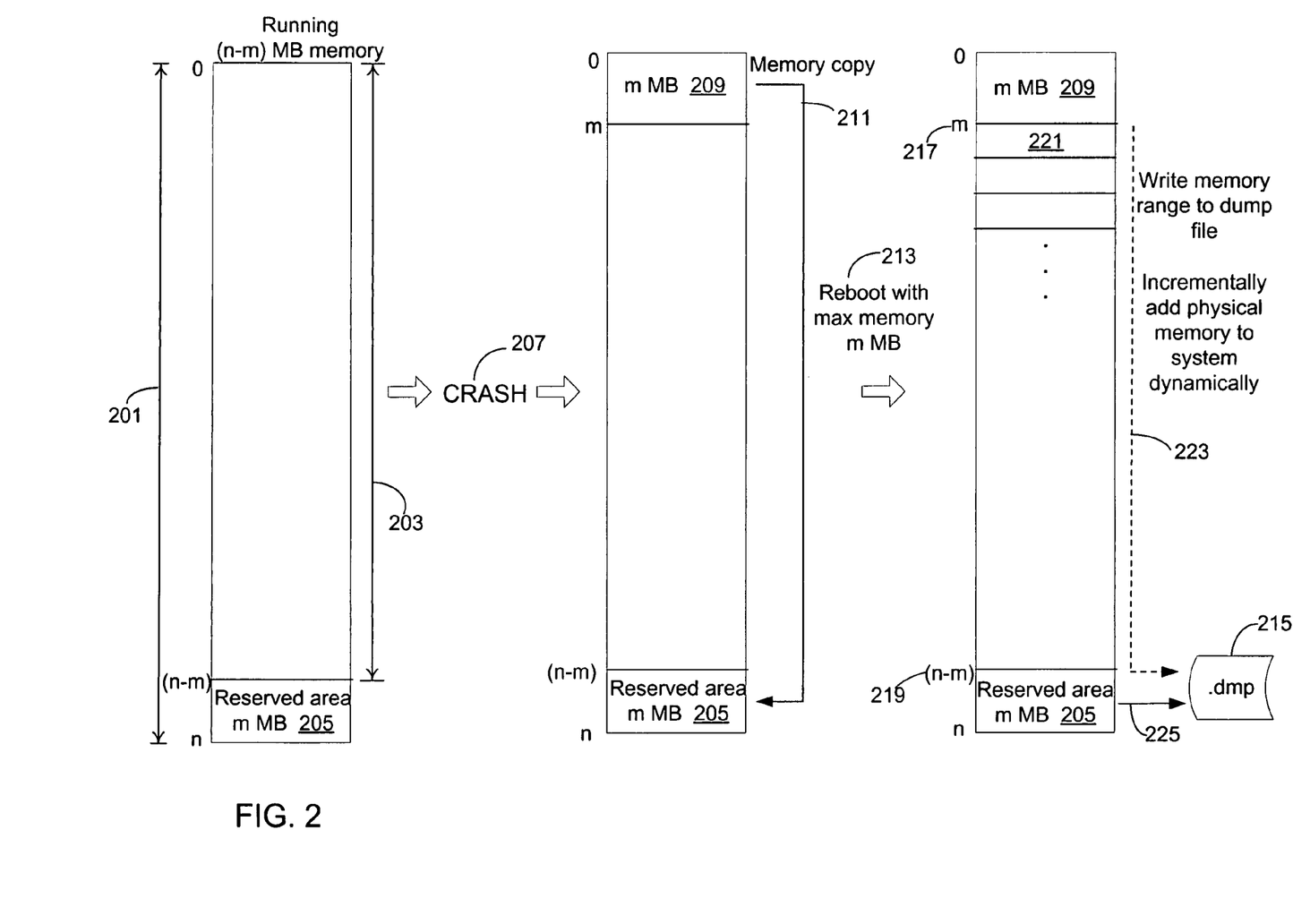
FIG. 2 is a diagram illustrating the generation of a memory dump following a system crash, in which a reserved memory area is employed to permit a memory dump to be performed after reboot, in accordance with an embodiment of the invention.
Figure 3:
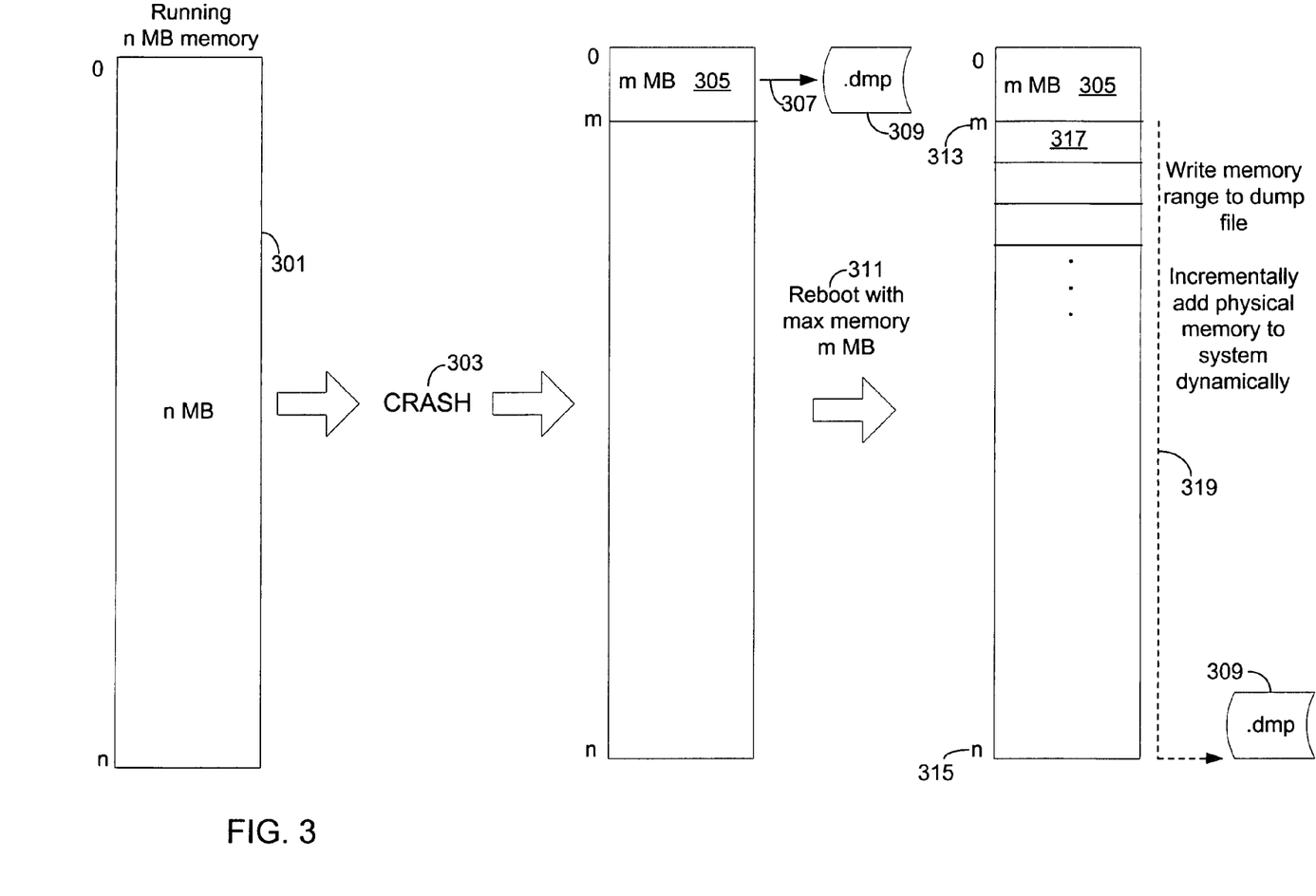
FIG. 3 is a diagram illustrating the generation of a memory dump following a system crash, in which a partial memory dump is performed prior to reboot and a reserved memory area is not used, in accordance with an embodiment of the invention.
Figure 4:
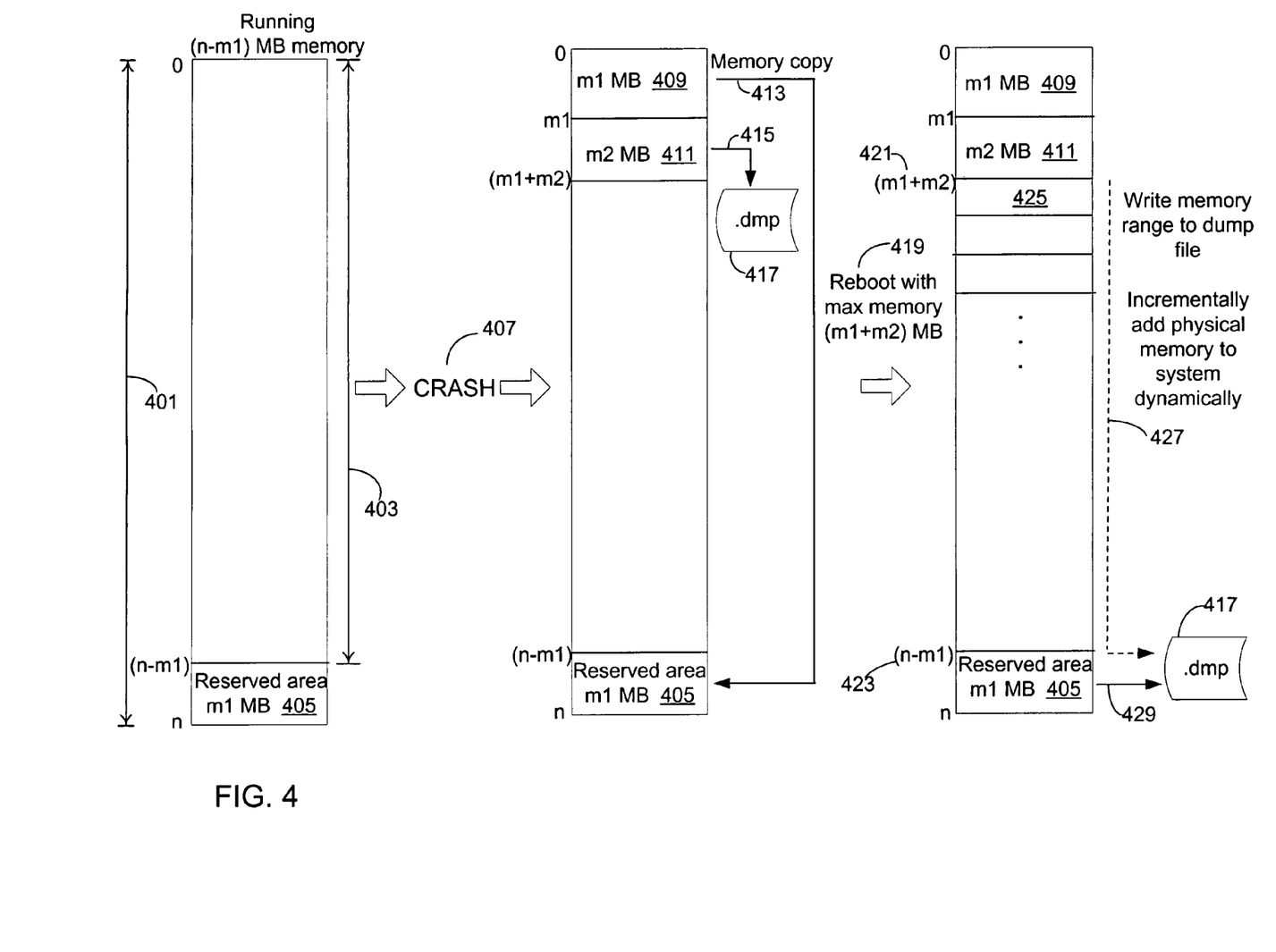
FIG. 4 is a diagram illustrating the generation of a memory dump following a system crash, in which features of the embodiments illustrated in FIGS. 2 and 3 are combined, in accordance with an embodiment of the invention.

Turning to the drawings, FIGS. 2, 3, and 4 illustrate embodiments of the present invention. As in FIG. 1, these drawings depict events in time, with time increasing from left to right. It should be noted that in this description and in the accompanying drawings, the description and depiction of sections of memory as being situated in particular regions of physical memory, such as at the beginning or end of the full range of physical memory, is purely for purposes of illustrative simplicity.

As illustrated in FIG. 2, in one embodiment of the invention, a computer system is represented as being equipped with n megabytes of physical memory 201, but prior to a crash event it runs with (n−m) megabytes 203 of memory. An m-megabyte area of memory is "reserved" space 205. In an embodiment, the size of the reserved area 205 can be configured to be up to half of the total onboard memory size.

Following the occurrence of a crash event 207, an initial m megabytes 209 of the memory 203 is copied (signified by the arrow 211) to the reserved area 205. This copying can be completed relatively quickly since it involves transferring data from and to main memory. A reboot 213 occurs, with the system configured to use m megabytes 209 of memory. The system employs a mechanism, such as, on certain architectures, setting up a private page directory entry (PDE) or the like, in order to access physical memory ranges that are not recognized by the operating system. In an embodiment using a private PDE, a paging size of at least four megabytes is used.

After the reboot 213, the memory image prior to the crash remains in the system memory. As noted below, in some embodiments this requires an alteration in the BIOS. The system writes the memory data in the reserved area 205 to a memory dump file 215; the writing is signified by the arrow 225. The system incrementally scans and writes the memory data in the range from m MB 217 to (n−m) MB 219 to the memory dump file 215. The scanning, writing and adding of memory is signified by the dashed arrow 223. When a unit of memory 221 (for example, every 256 MB or 512 MB in the range) is scanned and written to the memory dump file 215, the operating system dynamically adds this now-available physical memory to the system.

Certain embodiments, implemented on architectures in which Physical Address Extensions (PAE) or similar memory-addressing mechanisms are available and supported by the operating system, use a virtual reserved space and map the virtual reserved space to the physical reserved space 205. Embodiments implemented on partitioned NUMA multiprocessor systems have a reserved area 205 for each node, in accordance with the physical memory layout of the system. The relevant topological information may be determined at boot time, such as by way of a Static Resource Affinity Table (SRAT) constructed by firmware.

As illustrated in FIG. 3, in another embodiment of the invention, no reserved memory area is used. Initially the system is running with its full n megabytes of physical memory 301. Following the occurrence of a crash event 303, an initial m megabytes 305 of the memory 301 is copied (signified by the arrow 307) to a memory dump file 309. A reboot 311 then occurs, with the system configured to use up to m megabytes 305 of memory. After the reboot 311, the pre-crash memory image remains in the system memory, apart from the data stored in the m megabytes 305 that were written 307 to the dump file 309 prior to the reboot 311. The system incrementally scans and writes the memory data in the range from m MB 313 to n MB 315 to the memory dump file 309. As in the previously described embodiment, when a unit of memory 317 is scanned and written to the memory dump file 309, the operating system dynamically adds this now-available physical memory to the system. The scanning, writing and adding of memory is signified by the dashed arrow 319.

All else being equal, the embodiment illustrated in FIG. 3 will require more time to complete the memory dump process than the previous embodiment described with reference to FIG. 2. In the embodiment illustrated in FIG. 3, a partial memory space is written to disk after the crash occurs. However, this approach requires much less time than the prior art approach illustrated in FIG. 1, in which the entire memory space is written to disk before reboot. Moreover, the embodiment illustrated in FIG. 3 makes more economical usage of memory than the generally faster embodiment illustrated in FIG. 2, since a reserved area is not used.

Turning to FIG. 4, there is shown an illustration of a third embodiment of the invention that includes features of the embodiments illustrated in FIGS. 2 and 3. The depicted system is equipped with n megabytes of memory 401, but initially it runs with (n−m1) megabytes 403 of memory, and it keeps an m1-megabyte reserved memory area 405. Following the occurrence of a crash event 407, an initial m1 megabytes 409 of the memory 403 is copied (signified by the arrow 413) to the reserved area 405, and an additional m2 megabyte area 411 of the memory 403 is written to a memory dump file 417, signified by the arrow 415. A reboot 419 then occurs, with the system configured to use up to (m1+m2) megabytes 409, 411 of memory. After the reboot 419, the data in the reserved area 405 is written to the memory dump file 417; the writing is signified by the arrow 429. The system incrementally scans and writes the memory data in the range from (m1+m2) MB 421 to (n−m1) MB 423 to the memory dump file 417. The scanning, writing and adding of memory is signified by the dashed arrow 427. When a unit of memory 425 is scanned and written to the memory dump file 417, the operating system dynamically adds this now-available physical memory to the system.

Figure 5:
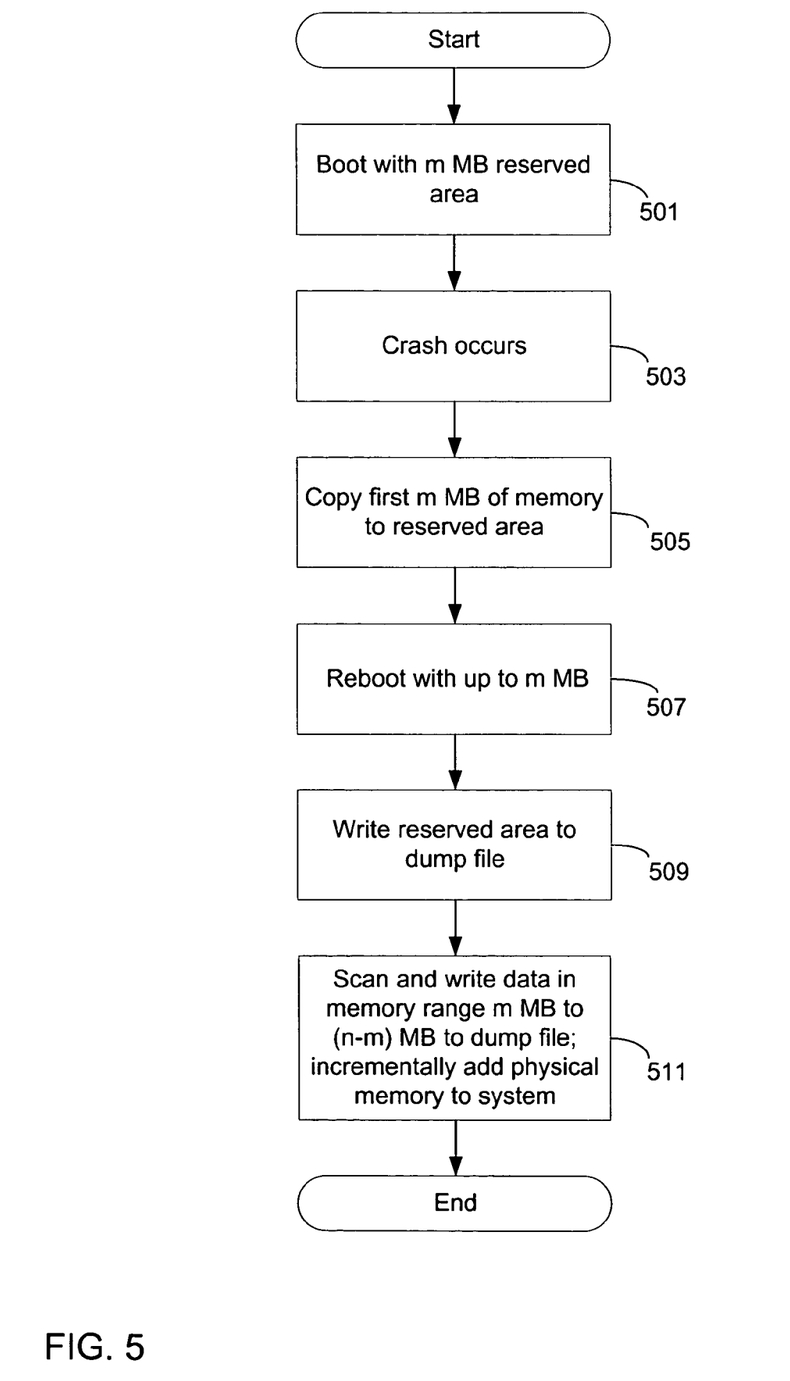
FIG. 5 is a flow diagram illustrating steps of a process corresponding to the embodiment illustrated in FIG. 2, in accordance with an embodiment of the invention.
Figure 6:
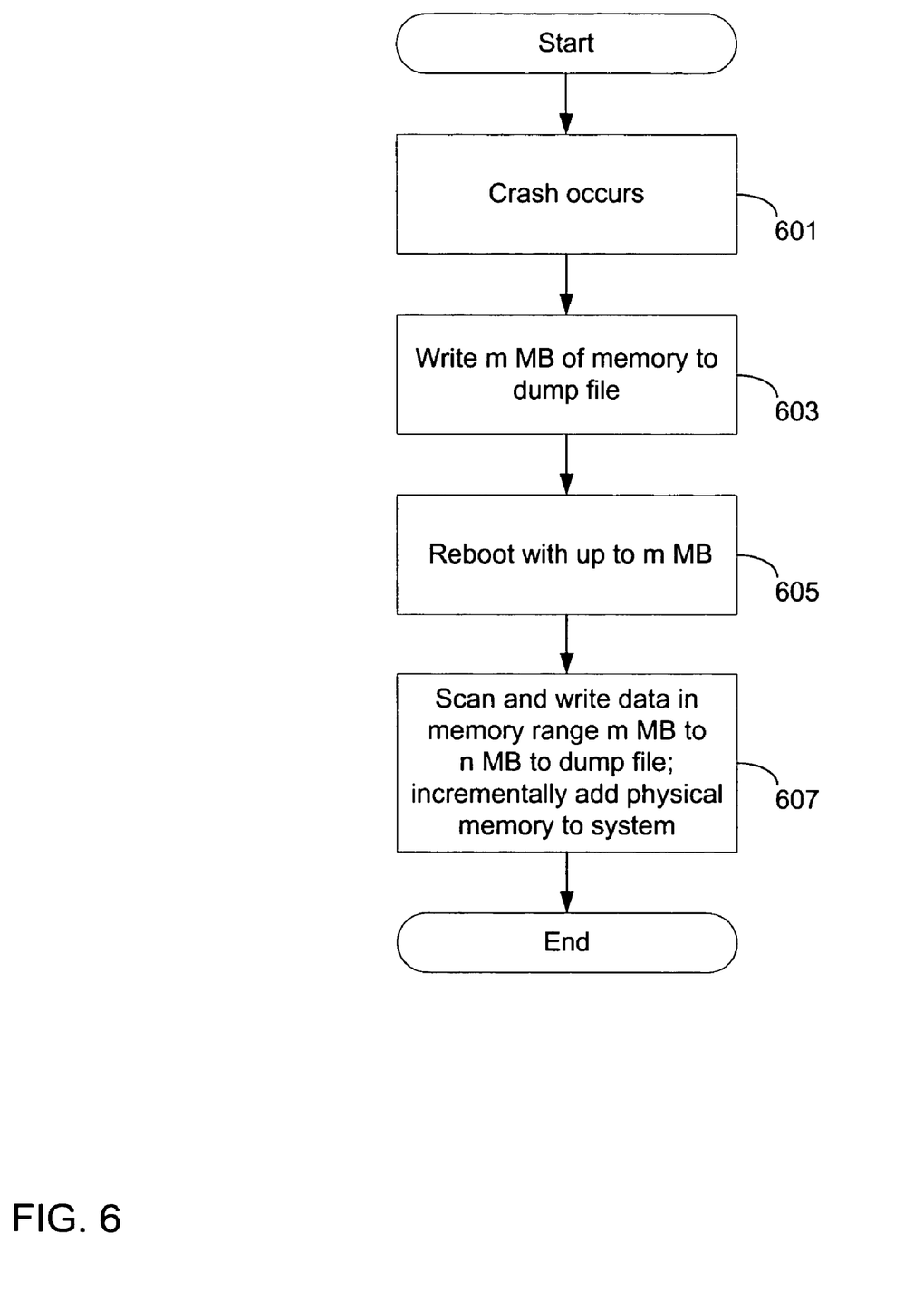
FIG. 6 is a flow diagram illustrating steps of a process corresponding to the embodiment illustrated in FIG. 3, in accordance with an embodiment of the invention.
Figure 7:
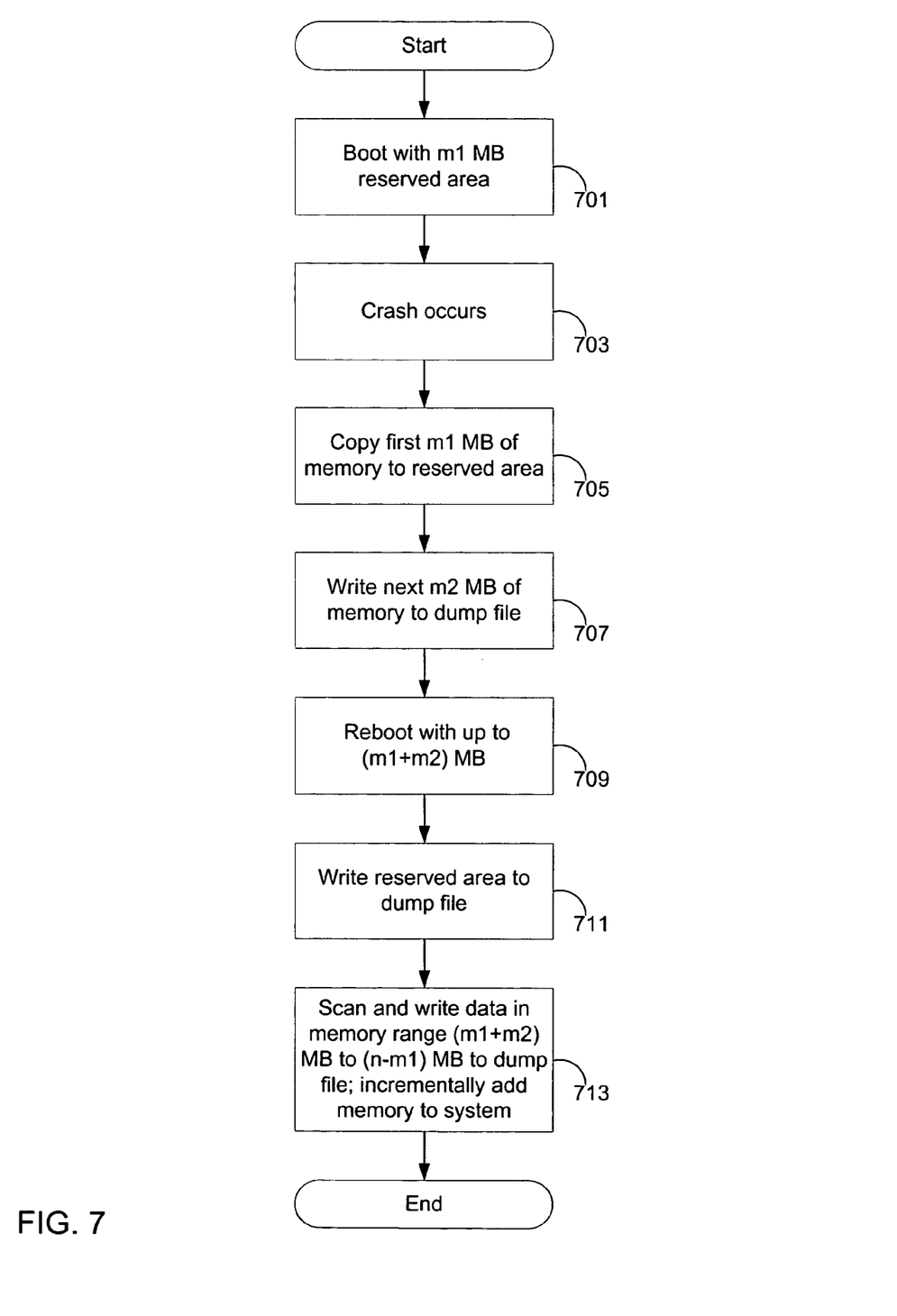
FIG. 7 is a flow diagram illustrating steps of a process corresponding to the embodiment illustrated in FIG. 4, in accordance with an embodiment of the invention.

The flow diagrams of FIGS. 5, 6, and 7 illustrate the previously-described embodiments more explicitly as processes implemented by way of a computer. FIG. 5 illustrates the method associated with the embodiment illustrated in FIG. 2.

At step 501 the computer boots with an m-megabyte reserved memory area. Following a crash (step 503), at step 505 m megabytes of memory (in this example, the first m megabytes of memory) are copied to the reserved area. At step 507 the computer reboots with up to m megabytes of memory. At step 509 the data contained in the reserved area is written to a memory dump file. At step 511 the operating system scans and writes the data image in the remaining physical memory to the dump file (not including the reserved area or the m-megabyte area that was copied to the reserved area). Incrementally, the system adds physical memory (for example, every 256 or 512 megabytes of scanned and written memory).

FIG. 6 illustrates the method associated with the embodiment illustrated in FIG. 3, in which a reserved area is not used. After the system boots using its available n megabytes of physical memory, at step 601 a crash occurs. At step 603 the first m megabytes of memory are written to a memory dump file. At step 605 the system reboots using up to m megabytes of memory. At step 607 the operating system scans and writes the data image in the remaining physical memory to the dump file. Incrementally, the system adds physical memory.

FIG. 7 illustrates the hybrid method associated with the embodiment illustrated in FIG. 4. At step 701 the computer is booted with an m1 megabyte reserved area. After a crash occurs (step 703), at step 705 a first m1 megabytes of memory are copied to the reserved area. At step 707 an additional m2 megabytes of memory are written to a memory dump file. At step 709 the computer reboots with up to (m1+m2) megabytes of memory. At step 711 the m1 megabytes of data contained in the reserved area are written to the dump file. At step 713 the system scans and writes the data image in the remaining physical memory to the dump file (excluding the (m1+m2) megabyte area with which the system booted and the m1-megabyte reserved memory area). Incrementally, the system adds physical memory.

Figure 8:
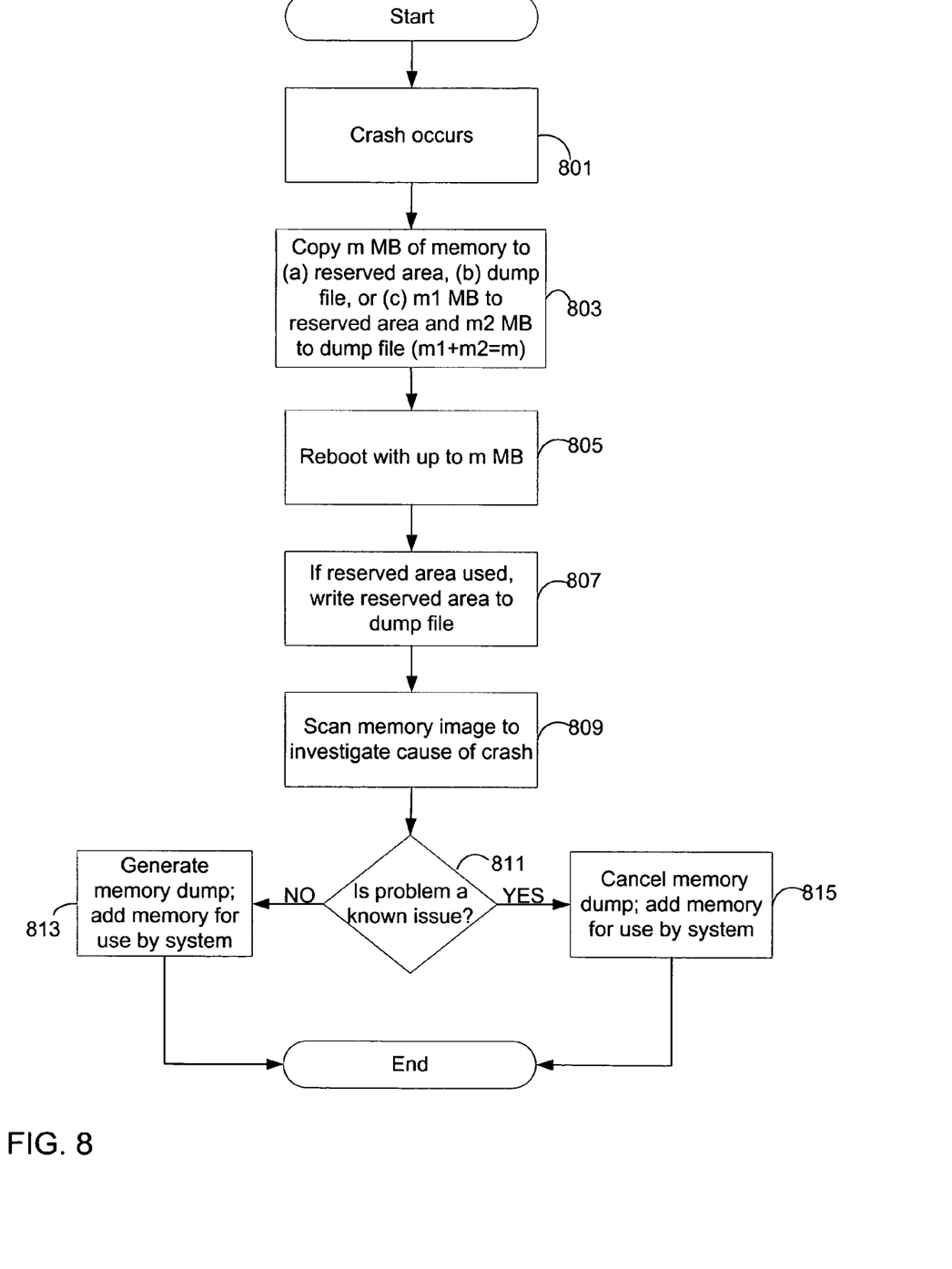
FIG. 8 is a flow diagram illustrating steps of a method for investigating a problem requiring a reboot, in accordance with an embodiment of the invention.

As illustrated in the flow diagram of FIG. 8, embodiments of the invention provide a method for investigating a problem that requires a reboot, such as a system crash. In accordance with the invention, under some circumstances, a full diagnostic memory dump following the reboot may be avoided. At step 801 of FIG. 8, a crash event occurs. At step 803, as explained above, m megabytes of memory are copied to a reserved memory space, to a memory dump file, or an m1-megabyte subset is copied to a reserved memory space and an m2-megabyte subset is written to a dump file. At step 805 the system is rebooted with the operating system using up to m megabytes of memory. If a reserved memory space is used, the reserved space is written to a dump file (step 807). At step 809 a scan of the memory image begins. If, during the scanning, it is determined that the problem that necessitated the reboot is a known issue or easily-solvable issue (decision block 811), completion of a full memory dump may be cancelled (for example, by a system administrator) (step 815). Otherwise a full memory dump is incrementally generated as explained above (step 813). Thus, by using this technique, investigation of the problem need not wait until generation of a full memory dump but can begin immediately after the reboot. For those cases in which the problem is a known issue, the period of time after reboot during which the system runs with limited memory and slow performance is accordingly minimized.

From the foregoing description it can be seen that a new and useful invention is provided, permitting quicker reboots in situations in which a crash or similar event has occurred and it is desirable to perform a full memory dump of a system having a large physical memory size. After reboot, the system runs relatively slowly because it is operating with reduced memory and because it is generating the memory dump. However, the invention provides system administrators with the ability to set a desired balance of down time and initial system performance after reboot, a choice that is not available in the prior art. For example, if the system is configured to use half of the onboard memory, then after a crash and reboot, the system operates with the expected memory size while immediately generating a memory dump. If a reserved area is used, the size of the reserved area can be set to accommodate the services required after reboot.

Embodiments of the invention are implemented on computer systems in which Basic Input/Output System (BIOS) firmware or the like, typically embedded on onboard ROM or flash memory, is executed at boot time. In conventional systems, the BIOS includes as its first phase a Power-On Self-Test (POST) that tests and initializes the computer hardware prior to the loading of the operating system. POST generally includes a read/write test of system RAM. Thus, in the case of a warm reboot or reset of the computer, the data contents of physical memory are overwritten. Embodiments of the invention therefore include embodiments in which the BIOS is configured in such a way that a memory test is not conducted during the reboot after a crash or other event in which a memory dump is desired, so that the contents of memory are preserved through the boot, thus permitting the postponement of the completion of the memory dump until after reboot. Other aspects of the invention may be achieved by way of changes to conventional BIOS definitions.

The invention may be performed by way of, or may include or be situated within, general-purpose or special-purpose computing systems of various kinds, including but not limited to servers, workstations, or personal computers, and including both uniprocessor and multiprocessor machines. In the case of multiprocessor systems, NUMA as well as UMA architectures are suitable, as indicated above. The general details of such computing systems and their varying configurations are rudimentary to those having skill in the art. The invention is particularly suitable for computer systems having a relatively large amount of main memory along with one or more secondary storage devices, either internal to the system or external (as for example external storage connected by way of a high-speed fiber channel).

The invention has been described above as being practiced in settings in which a crash event occurs and a full memory dump is desired for diagnostic purposes. However, the invention is more broadly applicable to other situations in which it is desirable to write a large amount of memory to a secondary storage device and in which a reboot is necessary but delaying the reboot until completion of the memory write would be undesirable. For example, a database may be mapped from hard disk to main memory in order to gain better performance for the database management system. However, in circumstances in which the system must be rebooted quickly, the database memory image must be saved onto disk. The present invention provides a method and mechanism for enabling the data to be written to disk without an undesirable postponement of the reboot.

Preferred embodiments of the present invention are described herein, including the best mode known to the inventors for carrying out the invention. In view of the many possible embodiments to which the principles of this invention may be applied, it should be recognized that the embodiments described herein are meant to be illustrative only and should not understood to limit the scope of the invention. Those having skill in the art will recognize that the described embodiments can be modified in arrangement and detail without departing from the spirit of the invention. Therefore, the invention as described herein contemplates all such embodiments as may come within the scope of the following claims and equivalents thereof.

What is claimed is:

1. A computer-readable storage medium having computer executable instructions for writing data contained in a physical memory to a storage device, comprising:

initiating a full memory dump of the physical memory by copying a first subset of the physical memory from a first location in the physical memory to a second location in the physical memory; wherein the second location is a reserved memory space within the physical memory;

rebooting the computer;

limiting an operating system running on the computer to the first subset of the physical memory;

with respect to one or more units of the physical memory other than the first subset, for each unit, writing data in the unit to the storage device and dynamically adding the unit for use by the operating system; and cancelling a completion of the full memory dump when it is determined that a crash event is a known issue.

2. The computer-readable storage medium of claim 1, wherein copying the first subset of the physical memory further comprises copying the first subset of the physical memory after an occurrence of a crash event.

3. The computer-readable storage medium of claim 1, wherein copying the first subset of the physical memory further comprises copying the first subset of the physical memory to the reserved memory space within the physical memory that is located at a predefined location within the physical memory.

4. The computer-readable storage medium of claim 3, further comprising, after rebooting the computer, writing data in the reserved memory space to the storage device.

5. The computer-readable storage medium of claim 4, wherein writing the data in the reserved memory space to the storage device further comprises writing the data in the reserved memory space to a memory dump file.

6. The computer-readable storage medium of claim 3, wherein copying the first subset of the physical memory to the reserved memory space further comprises copying the first subset of the physical memory to a reserved memory space of up to half of the physical memory.

7. The computer-readable storage medium of claim 3, wherein copying the first subset of the physical memory to the reserved memory space further comprises copying the first subset of the physical memory to a virtual reserved space that is mapped to a physical reserved space.

8. The computer-readable storage medium of claim 3, wherein copying the first subset of the physical memory to the reserved memory space further comprises copying a first subset of physical memory associated with a partition in a NUMA system to a reserved memory space associated with the partition.

9. The computer-readable storage medium of claim 1, wherein copying the first subset of the physical memory further comprises writing the first subset of the physical memory to the storage device.

10. The computer-readable storage medium of claim 9, wherein writing the first subset of the physical memory to the storage device further comprises writing the first subset to a memory dump file.

11. The computer-readable storage medium of claim 1, wherein copying the first subset of the physical memory further comprises copying a second subset of the physical memory to a reserved memory space, and writing a third subset of the physical memory to the storage device.

12. The computer-readable storage medium of claim 11, wherein writing the third subset of the physical memory to the storage device further comprises writing the third subset of the physical memory to a memory dump file.

13. The computer-readable storage medium of claim 11, further comprising, after rebooting the computer, writing data in the reserved memory space to the storage device.

14. The computer-readable storage medium of claim 13, wherein writing the data in the reserved memory space to the storage device further comprises writing the data in the reserved memory space to a memory dump file.

15. The computer-readable storage medium of claim 1, further comprising, after rebooting the computer, establishing a private page directory entry (PDE) to access a second subset of the physical memory that is not recognized by the operating system.

16. The computer-readable storage medium of claim 1, wherein rebooting the computer further comprises executing a BIOS that does not overwrite the data contained in the physical memory.

17. A method for investigating a problem requiring a reboot of a computer, the method comprising:

initiating a full memory dump of a physical memory in response to a crash event by copying a first subset of a memory of the computer;

rebooting the computer;

limiting an operating system running on the computer to the first subset of the memory; and cancelling a completion of the full memory dump when it is determined that the crash is a known issue; otherwise completing the full memory dump of the physical memory.

18. The method of claim 17, wherein completing the full memory dump includes copying a second subset of the memory and dynamically adding the second subset of the memory for use by the operating system.

19. The method of claim 17, wherein cancelling the completion of the full memory dump further comprises making additional physical memory available for use by the operating system.

20. The method of claim 17, wherein copying the first subset of the memory further comprises copying the first subset of the memory to a reserved memory space that is located within the same physical memory as the first subset of the memory.

21. The method of claim 20, further comprising, after rebooting the computer, writing data in the reserved memory space to a storage device.

22. The method of claim 17, wherein copying the first subset of the memory further comprises writing the first subset of the memory to a storage device.

23. The method of claim 17, wherein copying the first subset of the memory further comprises copying a second subset of the memory to a reserved memory space that is located within the same physical memory as the first subset of the memory, and writing a third subset of the memory to the storage device.

24. A system for writing data to a storage device, the system comprising:

a physical main memory containing the data;

a first subset of the physical main memory;

an operating system configured to perform actions, including:

initiating a full memory dump of the physical memory by copying the first subset of the physical main memory from a first location in the physical main memory to a second location in the physical main memory; wherein the second location is a reserved memory space within the physical main memory;

causing a reboot;

limiting memory usage following the reboot to the first subset of the physical main memory;

with respect to one or more units of the physical main memory other than the first subset, for each unit, writing data in the unit to the storage device and dynamically adding the unit for use by the operating system; and cancelling a completion of the full memory dump when it is determined that a crash event is a known issue.

25. The system of claim 24, further comprising an in-memory database.

26. The system of claim 24, further comprising a BIOS that does not cause the data contained in the physical main memory to be overwritten.

27. Computer-readable storage media having computer-executable instructions for writing data contained in a physical memory to a storage device, the instructions comprising:

initiating a full memory dump of the physical memory in response to a crash event copying a first subset of the physical memory from a first location in the physical memory to a second location in the physical memory; wherein the second location is a reserved memory space within the physical memory;

rebooting the computer;

limiting an operating system running on the computer to the first subset of the physical memory; and with respect to one or more units of the physical memory other than the first subset, for each unit, writing data in the unit to the storage device and dynamically adding the unit for use by the operating system; and cancelling a completion of the full memory dump when it is determined that the crash is a known issue; otherwise completing the full memory dump of the physical memory.

* * * * *